No. 675,191. Patented May 28, 1901.
W. A. BONSACK.
NUT OR BOLT LOCK.
(Application filed Sept. 7, 1900.)
(No Model.)
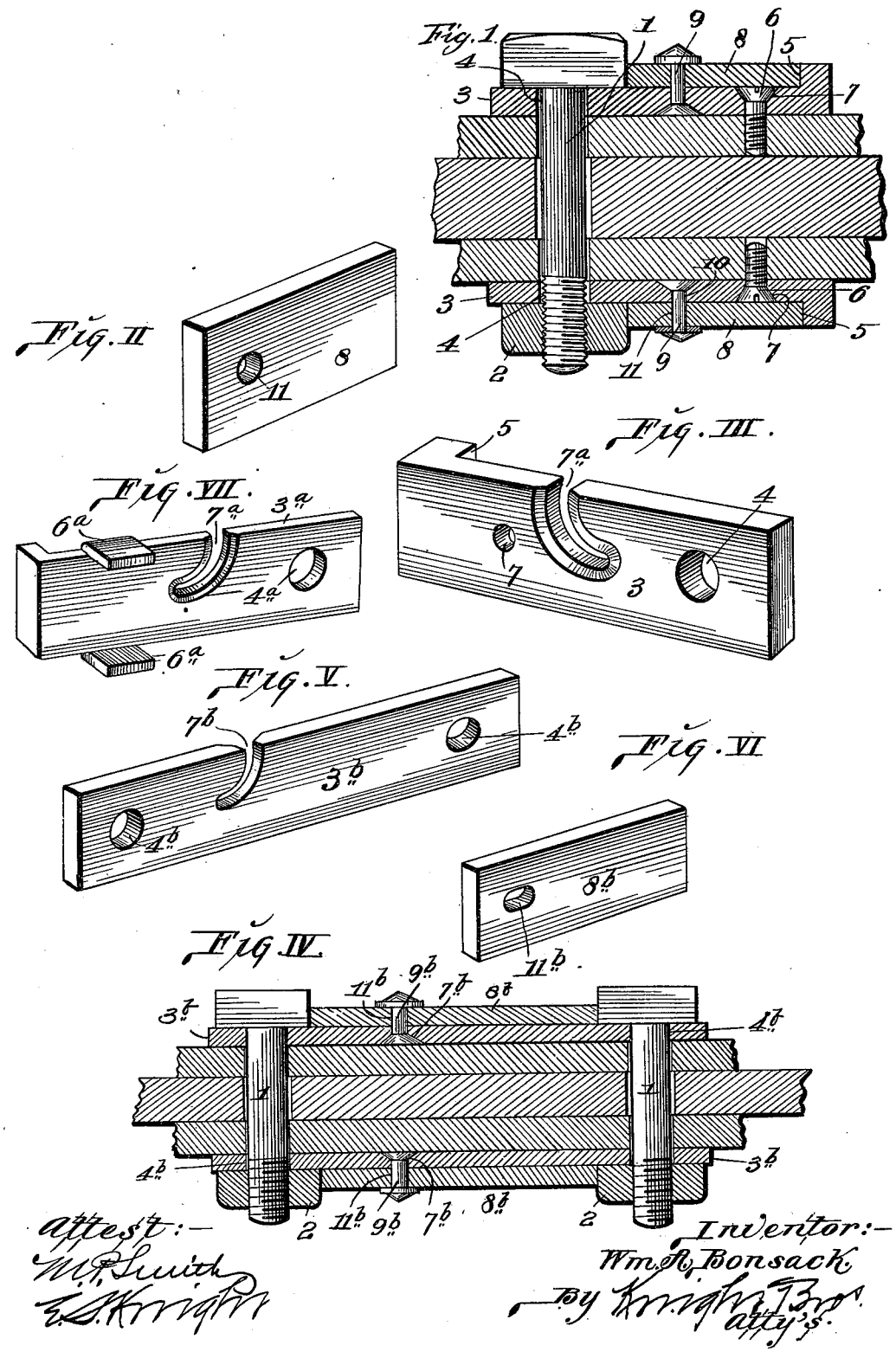
Inventor:—
Wm. A. Bonsack

UNITED STATES PATENT OFFICE.

WILLIAM A. BONSACK, OF ST. LOUIS, MISSOURI.

NUT OR BOLT LOCK.

SPECIFICATION forming part of Letters Patent No. 675,191, dated May 28, 1901.

Application filed September 7, 1900. Serial No. 29,252. (No model.)

*To all whom it may concern:*

Be it known that I, WILLIAM A. BONSACK, a citizen of the United States, residing in the city of St. Louis, in the State of Missouri, have invented certain new and useful Improvements in Nut or Bolt Locks, of which the following is a full, clear, and exact description, reference being had to the accompanying drawings, forming part of this specification.

My invention relates to a lock for securing bolts and nuts, and, briefly stated, comprises a washer suitably held and a locking-plate fixed to said washer in such manner as to bear against the nut or bolt to be secured.

My invention consists in features of novelty hereinafter fully described, and pointed out in the claim.

Figure I is a longitudinal sectional view illustrating my nut and bolt lock. Fig. II is a perspective view of the locking-plate. Fig. III is a perspective view of the washer. Fig. IV is a longitudinal sectional view through parts connected by two bolts, illustrating the application of my lock in such instance. Figs. V and VI are perspective views of the washer and locking-plate used in the form of the device illustrated in Fig. IV. Fig. VII is a perspective view of the rear side of a modified form of washer.

1 designates the bolt, and 2 the nut thereon.

3 designates a washer provided with a bolt-hole 4 and having a shoulder 5.

Where the device is used to secure a single nut or a single bolt, it is necessary that the washer 3 be held from turning, so that its position may remain fixed, and to so hold the washer I employ a suitable fastener inserted through an aperture 7 in the washer and entering into the part or parts held by the bolt and nut. In Fig. I, I have shown a screw 6 utilized for the purpose named; but it is evident that other equivalent means may be used in the same place—as, for instance, where the article through which the bolt passes is of wood a nail or pin may be substituted for the screw. Instead of using the screw 6 or similar holding means ears $6^a$ may be applied to the washer $3^a$, as illustrated in Fig. VII, the ears being designed to straddle the part to which the washer is applied and hold it from turning on the bolt.

8 designates a locking-plate seated between the shoulder 5 of the washer 3 and the nut or head of the bolt to be secured. This locking-plate is held in place against the washer 3 by a rivet 9, inserted through a curved slot $7^a$ in the washer and an aperture 11 in the locking-plate. The locking-plate is held securely by the rivet without liability of becoming accidentally displaced from its seat; but when at any time it is desired to free the nut or bolt it is only necessary to cut the rivet by the use of a cold-chisel or other suitable implement, when the plate may be lifted off of the rivet out of its seat.

The washer 3 is provided with the curved slot $7^a$ to facilitate the removal of an old rivet and the insertion of a fresh one without the necessity of removing the washer. The provision of the slot in the washer also provides for adjustment of the locking-plate to and from the lock or bolt to be secured, inasmuch as the rivet by which the locking-plate is secured to the washer may be located in any position throughout the extent of the slot. The slot curving from the edge of the plate toward the bolt-hole permits the proper placing of the locking-plate and also permits the ready removal of the locking-plate as the rivet is slipped through the slot to the washer's edge.

In Figs. IV to VI, inclusive, I have shown the parts of a form suitable for securing a pair of nuts or bolts located in proximity to each other. In this instance the washer $3^b$ is provided with two bolt-holes $4^b$ and held at each end by the bolts, and the screw 6 or other holding means is dispensed with. The locking-plate $8^b$ is applied to the washer by a rivet $9^b$ passing therethrough in the same manner as in the construction where but a single nut or bolt is held, the locking-plate bearing against the two nuts or bolts secured. Any inclination of one nut or bolt to turn is prohibited by the other nut pressing against the locking-plate, so that the two nuts or bolts through the interposed locking-plate act to hold each other.

The openings and slots in the washer and locking-plate are preferably concaved, as shown, in order that the heads of the rivets, screws, or other parts passing therethrough may lie flush with the surfaces of the parts through which they pass, so that the parts may be snugly fitted.

It is obvious that the locking device herein shown and described may be applied to both the heads of bolts and to nuts collectively, as shown, or that it may be applied to either individually without applying it to the other.

I claim as my invention—

In a nut or bolt lock, the combination of a washer through which the bolt passes, said washer being provided with a curved slot; a locking-plate adapted to bear against the member to be secured, and a rivet removably and adjustably located in the slot of said washer arranged to secure said plate to said washer, substantially as described.

WILLIAM A. BONSACK.

In presence of—
E. S. KNIGHT,
N. V. ALEXANDER.